Patented June 25, 1940

2,205,985

UNITED STATES PATENT OFFICE 2,205,985

METHOD FOR DISPERSION OF PIGMENTS IN FILM-FORMING VEHICLES

Alexandre James Lapointe, Louisville, Ky., assignor to Devoe & Raynolds Company, Inc., a corporation of New York No Drawing. Application May 31, 1935,
Serial No. 24,357

13 Claims. (Cl. 134—79)

This invention involves new and useful methods of dispersing a wide variety of commercial pigments in practically all types of protective coating and printing ink vehicles which I term film forming materials. That is, these methods enable one to uniformly and completely disperse both organic and inorganic pigments in oil, compounds, of the nondrying, semi-drying, and drying types, also blown and kettle bodied oils, all types of varnishes, many natural and synthetic resin solutions, cellulose esters and ethers. These dispersions can all be obtained in regular commercial paint, enamel, ink and lacquer formulations by the proper methods of addition of the various ingredients in some form of simple change-can stirring or mixing device.

Prior to this time substantially all operations effecting pigment dispersion in various vehicles used in paints, enamels, lacquers, ink, etc., required some form of so-called grinding by a stone mill, roller mill or pebble mill. Numerous varieties of all these mills have been and still are employed for the purpose of completely wetting and uniformly dispersing pigments or finely divided solids comparatively insoluble in the vehicle. Recently, many improved modifications of these machines have been used such as the colloid mill on one hand and the Banbury mixer on the other. The two roll mill heretofore widely used in the rubber industry, and also improved intensive milling devices closely related to the well known putty chasers have been used of late with marked success. All of these mills however depend principally on various types of shearing, induced primarily by the mechanical work expended in driving the mill to act upon a more or less viscous liquid to break down the pigment agglomerates into a dispersion consisting mainly of wet single particles or very small agglomerates suspended in the vehicle. In general, however, these processes do not take full advantage of the tremendous forces of chemical swelling which accompanies the dispersion of colloidal aggregates into small particles.

In all of the above mentioned processes much unnecessary work is done to accomplish the desired object. That is, too many foot pounds of work are done on each pound of pigment or if you choose, on a unit quantity of paste or finished product. It is also true that the rate of production of these relatively expensive and cumbersome mills is usually low. At any rate, the energy consumed (k. w. hours) per unit amount of finished product is much higher than need be. The new methods which are hereby described will readily convince one that they are vastly more simple and economical than any of the regular known methods.

Broadly speaking, my invention comprises the steps of forming a colloidal solution of a solid film-forming material in a liquid vehicle preferably present in sufficient quantity to form a relatively fluid body and then mixing into this fluid body a mass of pigment in such quantity that the resulting mixture can be stirred by ordinary means and preferably remains as a pourable slurry; after which the material is given a treatment which produces an increased degree of dispersion of the colloidal particles contained in the colloidal solution. When these steps are followed, it will be found that the pigment and the colloidal material intermingle in the solution at the time of mixture and when the colloidal material is subsequently dispersed, it acts with disruptive force to break down the pigment aggregates and as a result an extraordinarily fine distribution of the pigment is obtained. The dispersion of the colloidal particles may be effected either by the use of a solvent which reduces the particle size or, under proper conditions, heat may be employed to accomplish this dispersion.

Heat bodied oils, blown oils, sulfurchloride treated oils, oil-resin combinations such as varnishes, or many other varieties of treated drying oils contain substantial percentages of material which is of a colloidal nature, i. e., consists of particles formed by the association or polymerization or union of a number of molecules to form the larger particles. This can be measured by increase in the so-called average molecular weight or by increase in viscosity as compared to the original material or the presence of this dispersed colloidal phase may be shown in the case of these materials by the action of certain organic liquids such as acetone, which on being added to the solution throw out the colloidal material as an insoluble phase. These colloidally dissolved particles or aggregates of the film forming material have affinity for pigment so that if pigments are stirred in, the pigment clusters attach themselves to the colloidal aggregates of the film forming material.

If we then add a solvent for the film forming material or if we heat, preferably suddenly, the aggregates of the film forming material are dispersed to a more finely divided condition, or we may say we have increased their degree of dispersion. Coincident with this the pigment clusters attached to the colloidal aggregates of film forming material are also dispersed and we get smooth enamels, paints, lacquers and similar products in which the cryptometer expectancy of the pigment is practically (or substantially) fully realized.

It is recognized that the disruptive forces resulting from increasing the degree of dispersion of the colloidal material decrease as the degree of dispersion increases. For this reason, I find that where a very fine dispersion of the pigment is desired, it is advantageous to prepare the preliminary liquid in a form where it actually contains gelatinized material, that is, material in which the particle size of the solid ingredient has exceeded the colloidal size and reached a size which is filterable by ordinary methods. Such a material may readily be produced by acting on a solid with a limited amount of solvent or swelling agent or it may be produced by partial precipitation from a true or colloidal solution. If, on the other hand, the pigment is stirred into a liquid containing no material in the solid state, it will still be broken up by increasing the degree of dispersion of the colloidal material but the extent to which the pigment will be broken up or the amount of pigment that can be acted on will be reduced unless the extent of change in the dispersion of the colloidal material is very great such as the increase in dispersion that can be obtained by sudden heating in the presence of solvent materials.

Thus in making lacquers and enamels, I find that it is most advantageous to add the pigment to a liquid containing solid material in the gelatinous state as well as material in the colloidal state, and in such case the increase in dispersion can be accomplished by the addition of solvent.

Under some circumstances, in the production of enamels from a varnish base, there normally will be less colloidal material present (though some colloidal material is always found in varnishes) and in this case I find it advantageous to increase the degree of dispersion by the action of heat which is best applied by mixing the pigment with one portion of the varnish and then rapidly adding another portion of heated varnish to the portion containing the pigment.

In the case of paints where an exceedingly fine dispersion of pigment is not necessary, I find that the desired results can be obtained if a preliminary mixture is made of heat treated or otherwise processed drying oil (which produces gelatinous bodies in the oil) and a thinner such as naphtha or turpentine and the pigment is stirred into this mixture, after which the bulk of the drying oil used for the paint is added hot to the pigment slurry. In such case the action of the hot oil appears to suddenly increase the degree of dispersion of the colloidal material in the processed oil and then serves to break down the pigment aggregates and give the necessary degree of dispersion of the pigment.

The case where the gelatinous material is prepared by the action of a swelling agent on a solid may be illustrated with cellulose esters and ethers, rubber resins such as those sold under the names of "Tornesit" and "Pliolite" and various synthetic and natural resins. In such case the solid may be first swollen and then the pigment stirred in, or if desired, the solid material in finely divided form may be mixed with the pigment, after which the mixture is first treated with a swelling agent and then a solvent, or a solvent which serves both purposes may be gradually stirred in.

In a parallel way when the gelatinous material is produced from the liquid as by partial precipitation with a non-solvent the pigment may be stirred into the gelatinized mass or the pigment may be stirred into the liquid material followed by the precipitation and subsequent resolution. In other words, it is desirable to have a good mixture of the pigment and the vehicle, and we may use the best methods available for getting such mixture with a minimum of mechanical effort and the minimum of kneading and shearing action in order to save expense, for it is to be borne in mind that no breaking up of the pigment aggregates is expected prior to the actual increase in degree of dispersion of the colloidal particles in the mass. Under these circumstances, it usually will be found advisable either to do the mixing in the dry phase as a preliminary or later when enough liquid has been added to form a pourable slurry.

With the foregoing explanation of what I believe are the principles involved, my invention can readily be understood by reference to the following illustrative examples which I have divided into three classes as follows:

Class I, applicable particularly to bodies such as cellulose esters and ethers, natural and synthetic resins, gelled blown oils and the like. In such case suitable organic solvents and non-solvents are employed to swell and disperse the solids in the presence of the pigment. The action is preferably done under conditions making quite a fluid slurry and preferably is accompanied by vigorous agitation.

Class II is applicable to certain resins such as alkyd resins and heavy bodied blown oils which may be readily dissolved in solvents and precipitated by the addition of certain non-solvents such as petroleum thinners. In this case the pigment is either added to the gelatinous precipitate which is redissolved, or the pigment is stirred into a solution which is precipitated by the addition of the non-solvent after which supernatant diluent is decanted and the precipitate redissolved. In this class the solution may be accomplished by addition of a straight solvent or an additional quantity of the original solution may be employed.

In both Classes I and II the use of some heat is usually useful particularly during the time that the pigment is being stirred into the colloidal solution but generally speaking, heating is not absolutely necessary.

Class III. This is particularly applicable to the pigmentation of colloidal solutions where little or no gelatinous material is present and the use of heat with or without additional quantities of dispersing agents is useful for giving a rapid increase in the degree of dispersion of the colloidal particles. I have found this treatment particularly valuable where it is not desirable to combine the fluxing of the resins with pigmentation or where relatively small proportions of colloidal material are employed as where some heat bodied oil is used with thinners and usual drying oil in the preparation of paints. The heat usually (though not necessarily) will be applied by adding hot liquid to the mass containing the pigment, which may be mixed to a fairly stiff paste if found desirable.

While these three classes help to identify the specific examples it is not to be understood that they constitute universal distinctions for given processes may fall into more than one class, and it may be possible to produce colloidal solutions by methods other than those of Classes I and II and add pigment and then disperse by the use of solvents without using heat as specified in Class III.

In these examples when I refer to simple stirring I intend to suggest that type of stirring which can be obtained with a change-can mixer. More violent agitation or kneading may be employed but it is a feature of my invention that heavy mechanical work is not essential.

Example IA 150 grams of pigment, titanium oxide for example, were mixed with 50 grams of Vinaloid H resin (a solid product of vinyl chloride and vinyl acetate) and after stirring the dry mass thoroughly 75 grams of toluol were added at room temperature with vigorous agitation. While maintaining constant stirring, 25 grams of plasticizer such as dibutyl phthalate were introduced and at the same time the temperature of the mass was raised to approximately 75 to 80° C. by the use of a water bath.

During this interval the mass which had become almost ropey began to melt down to a viscous paste due to the swelling action of the toluol on the resin. It must be remembered at this point that the resin swells completely to a continuous uniform gel-like structure in toluol at a temperature of about 75° C.

When this thin paste was thoroughly mixed 100 grams of Hexone (methyl butyl ketone) were added in small portions over a period of about ten minutes. This served to substantially completely disperse the resin gel and also the pigment. A portion of this end product was removed and thinned equal parts by weight with Hexone and a portion of this mixture was tested with a Pfund cryptometer and a reading of 26 was obtained. This was considered extremely good for pigment concentration (titanium oxide) was 18.8% and this quantity when completely dispersed would only be expected to give a reading of 27 on the same scale. Hence what might be termed the cryptometer expectancy had been surpassed.

Example IB

To 100 parts of wet ½ second nitrocellulose 200 parts of medium chrome yellow pigment (lead chromate) were added together with 40 parts of butanol, 140 parts of toluene and 100 parts of a petroleum diluent. This mass was well stirred for approximately 30 minutes and to it were then added slowly and with vigorous agitation 40 parts of ethyl acetate, and 80 parts of butyl acetate. The agitation consisted of simple stirring for 20 minutes at 25° C. In this instance an excellent dispersion of pigment was obtained. In fact, the resulting product was perfectly smooth and free from pigment agglomerates, such a product that might be considered commercially acceptable without centrifuging.

Example IC 100 grams of linseed oil blown approximately to the point of gelation were mixed with 100 grams of titanium oxide and 50 grams of "Cellosolve" (monoethyl ether of ethylene glycol). The mass was rapidly agitated by simple stirring and heated to a temperature of 75° C. for a period of one hour. During this time the pigment in its agglomerated form was first absorbed by the gelatinous mass and later dispersed as the gel went into solution in the solvent at the elevated temperature. This dispersion was found to be nearly perfect. The only objectionable foreign matter consisted of small bits of undissolved oxidized gel but no pigment agglomerates were present. This same procedure using lead chromate as the pigment gave equally good results.

The following formulas show the empirical composition of a series of practically perfect pigment dispersions in a wide variety of resins and cellulose derivatives. In each instance the same principle was employed consisting of agitating the pigment with a solid vehicle in the presence of a non solvent or partial solvent for the latter and then dispersing the pigment by the use of a true solvent for the vehicle during which the latter itself was dissolved.

ID pigmented "Tornesit" formula

| | Parts by weight | |
|---|---|---|
| TiO$_2$ | 100 | original mixture |
| Tornesit (chlorinated rubber resin) | 50 | |
| V. M. P. Naphtha | 50 | |
| Xylol | 100 | |
| Xylol | 100 | final addition |

IE Pliolite white primer

| | | |
|---|---|---|
| Cryptone {50% zinc sulfide, 50% barium sulfate} | 400 | original mixture |
| Pliolite (chlorinated rubber resin) | 200 | |
| Mineral spirits | 250 | |
| Mineral spirits | 100 | |
| Boiled linseed oil | 100 | final addition |
| Wood oil | 100 | |
| Mineral spirits | 250 | |

IF Wax free shellac with TiO$_2$

| | | |
|---|---|---|
| TiO$_2$ | 150 | Here a single solvent mixture was added gradually |
| Shellac (wax free) | 100 | |
| Toluol | 30 | |
| Alcohol | 30 | |
| Butanol | 40 | |

IG Pontianac spirit white enamel

| | | |
|---|---|---|
| Pontianac nubs | 100 | original mixture |
| TiO$_2$ | 100 | |
| Toluol | 100 | |
| Alcohol | 28 | final addition |

IH TiO$_2$ in cellulose acetate

| | | |
|---|---|---|
| Cellulose acetate | 40 | original mixture |
| TiO$_2$ | 80 | |
| Toluol | 126 | |
| Solvent | 54 | |
| Solvent | 200 | final addition |

The solvent was made up as follows:

| | Percent |
|---|---|
| Ethyl lactate | 20 |
| Methyl "Cellosolve" | 20 |
| Acetone | 20 |
| Ethylene dichloride | 30 |
| Alcohol | 10 |

The "Cellosolve" used in this example was mono ethyl ether of ethylene glycol.

IJ TiO$_2$ in ethyl cellulose

| | Parts by weight | |
|---|---|---|
| Ethyl cellulose | 50 | original mixture |
| TiO$_2$ | 100 | |
| Xylol | 270 | |
| Alcohol | 40 | final addition |
| "Cellosolve" | 40 | |

The "Cellosolve" used in this example was the mono butyl ether of ethylene glycol.

IK TiO$_2$ in benzyl cellulose

| | Parts by weight | |
|---|---|---|
| Benzyl cellulose | 50 | original mixture |
| TiO$_2$ | 100 | |
| Toluol | 168 | |
| Petroleum diluent | 52 | |
| Methyl "Cellosolve" acetate | 70 | final addition |

The "Cellosolve" used in this example was the acetic acid ester of the mono ethyl ether of ethylene glycol.

Example IL 100 grams of white heavy bodied blown linseed oil were treated with a large excess of low boiling petroleum diluent (boiling point range 195°–260° F.) such as the naptha known commercially as "Tolusol" during which treatment oil was precipitated as a weak gelatinous mass. About 1200 grams of the naphtha were used to obtain this precipitate. The latter separated rapidly and settled to the bottom of the container as a semi-opaque mass, whereupon the petroleum diluent constituting the supernatant liquid was decanted off. Then to the gel still wet with petroleum diluent was added 200 grams of pigment. Pigments such as the titanium group, lithopones, zinc sulphide, zinc oxide, the iron oxides, the chrome yellows, toluidines, and others have all been successfully used in this connection. Pigment and gel were agitated vigorously to obtain good mixing for about ten minutes.

To the mixture was then added 175 grams of the same heavy bodied blown linseed oil. This rapidly effected a resolution of the gel and at the same time dispersed the pigment. Since the resulting paste, however, was very heavy more oil together with thinner was added. This consisted of a mixture of 100 grams of the same oil with 100 grams of a petroleum thinner known as Solvesso #2 (a hydrogenated petroleum having a boiling point range of 275°–365° F.). The pigment content was adjusted to 25%. In the case of titanium oxide a Pfund cryptometer reading of 23 was obtained as against an expected value of 21 thus indicating a good dispersion. These operations were all performed at ordinary room temperatures unless otherwise indicated.

Example IM 50 grams of an alkyd resin solution in xylene (50% solids) were treated with a large excess of petroleum diluent (such as Tolusol referred to above) about 250 grams at 25° C. A semi-opaque granular gelatinous mass was precipitated and removed from the supernatant diluent. This gel was then mixed with 37.5 grams of titanium oxide and thoroughly stirred for about ten minutes at room temperature. After this mixing 50 grams of the same resin solution were added together with 7 grams of xylene and 3 of butanol. When solution of the gelatinous mass was completed, cryptometer measurements indicated very good pigment dispersion.

Example IN

To 100 grams of oxidizing type alkyd resin solution was added a large excess, about 600 grams of petroleum diluent (such as "Tolusol"), thus yielding a granular gelatinous precipitate. After decanting off most of the super-natant liquid 75 grams of pigment $TiO_2$ were added and thoroughly mixed with the gel for approximately 15 minutes at room temperature. This gel weighed approximately 50 grams since the original resin solution employed contained 50% by weight of resin.

To the mixture of pigment and gel was added 50 grams more of the non-solvent petroleum diluent and 50 grams of xylene. After this was thoroughly mixed for ten minutes at room temperature the gel was found to be re-dissolved and an excellent pigment dispersion was obtained. A Pfund cryptometer reading of 14 was obtained for a titanium oxide concentration of 32.6 as compared to an expected reading of 16.

It is also noteworthy that if heat is applied during the mixing of the pigment with the gel and non-solvent that a very much better mixture is obtained and also less volatile material is required during this operation. The net result of this is that when the pigment is finally dispersed during the solution of the gel in the next operation a much better pigment dispersion is obtained. In fact, the use of heat for such purposes as obtaining high pigment concentration in case of certain resins such for example as the resin known as Vinaloid H (referred to above in Example IA) is very necessary.

Example IO

In this case 200 grams of a nitrocellulose solution such as described in Example IIB were stirred with about 400 grams of petroleum diluent. The granular gelatinous mass thus precipitated was mixed with 200 grams of $TiO_2$ by simple stirring with a small motor stirrer for 20 minutes after decanting off most of the supernatant liquid. Then with continued simple stirring 36 grams of ethyl acetate and 100 grams of butyl acetate were added very slowly. Within 15 minutes the gel was re-dissolved and a good dispersion of pigment obtained.

EXAMPLES IN CLASS II

Example IIA 100 grams of titanium oxide were mixed with 100 grams of a 50% alkyd resin solution. When this paste was well mixed by simple stirring with a small motor stirrer in a change-can mixer an excess (about 200 grams) of a petroleum diluent, such as Tolusol, was added. In this case the resin was precipitated together with the pigment. The supernatant liquid was removed and the mass of gel and pigment agitated with a small additional quantity, (25 grams) of the diluent. This method was used with the particular resin solution in question because had the latter been precipitated alone a tough, ropey mass would have resulted to which it would have been difficult to add the pigment. By the combined precipitation, however, and the use of additional diluent a stirrable mass was obtained which gave very good mixing.

After this, 100 grams of the original resin solution together with 25 grams of xylol and 5 grams of butanol were added with vigorous agitation. This sufficed to dissolve all of the gelled resin and maintain a satisfactory low viscosity throughout the entire operation. A good pigment dispersion was obtained.

The above procedure was used with a solution of a drying oil modified alkyd resin (#2452 Glyptal) and bone black. In this case the dispersion was sufficiently good to realize our cryptometer expectancy but the end product was not very smooth which was probably due to an incomplete dispersion of the calcium phosphate.

Example IIB

To 200 grams of a half second R. S. nitrocotton solution of the following composition was added with simple stirring at room temperature 200 grams of pigment ($TiO_2$).

| | Per cent |
|---|---|
| ½" R. S. nitrocotton wet with alcohol | 37.0 |
| Toluol | 30.0 |
| Butanol | 5.0 |
| Ethyl acetate | 12.0 |
| Butyl acetate | 16.0 |
| | 100.0 |

After stirring ten minutes a large excess of petroleum diluent was added (about 400 grams). This precipitated the nitrocotton which also brought down the pigment. The supernatant liquids were removed and then while stirring the wet precipitate vigorously 36 grams of ethyl acetate and 100 grams of butyl acetate were added slowly. In this way the nitrocotton was redissolved and the pigment well dispersed. Only fifteen minutes further stirring were given after the final solvent addition.

EXAMPLES IN CLASS III

Example IIIA 100 grams of pigment such as titanium dioxide were added to 80 grams of a hot varnish with vigorous agitation. Varnish had been preheated to approximately 300° F. A smooth viscous paste resulted to which after stirring for approximately 10 minutes was added at 150° F., 320 grams of the same varnish which had been heated to a temperature of 300° F. The latter caused the paste to thin rapidly and the entire mass had very little viscosity. Agitation was continued, however, for about 30 minutes during which time the finished enamel had cooled to nearly the room temperature. A very good dispersion of the pigment was obtained. The varnish employed in this case was a thirty gallon China-wood oil varnish based on ester gum and the phenolic resin Durez 550. The varnish had a nonvolatile content of 50% and a Gardner and Holdt viscosity of F.

Example IIIB 130 grams of $TiO_2$ and 13 grams of ZnO were stirred at room temperature with a solution of a drying oil modified alkyd resin [GE1247 glyptal] (65% resin in xylene). After thus mixing for ten minutes 170 grams of the same 1247 glyptal solution was added at a temperature of 300° F. Directly 87 grams of high flash naphtha were introduced. Continuous simple stirring was continued throughout those conditions and for twenty minutes thereafter. This final product was a good white baking enamel representing a commercial formulation and it gave a Pfund cryptometer reading of 18 as compared to an expected 20. This was ample proof of the excellent pigment dispersion obtained.

Example IIIC

To 100 grams of white heavy bodied blown linseed oil at temperature of 350° F. was added 100 grams of $TiO_2$. The mass was rapidly stirred for 15 minutes without further heating. Then when the paste was at a temperature of about 150° F. or less 300 grams of a solution of a drying oil modified alkyd resin such as glyptal 2453 were added at a temperature of 300° F. After continued stirring for 20 minutes an excellent dispersion was obtained. A cryptometer reading of 26 was obtained compared to an expected reading of 25½.

Example IIID 100 grams of medium chrome yellow (lead chromate), was added to 80 grams of varnish such as described in Example IIIA. This mixture was readily stirred for about ten minutes and then 320 grams of the same varnish at a temperature of 300° F. were added in a period of one minute. The mixture was stirred for 20 minutes and finally tested for hiding power and examined for undispersed pigment. Excellent dispersion was obtained.

Example IIIE

A pigment mixture was made of 276 grams of barium Titanox (a pigment consisting essentially of 25% $TiO_2$ and 75% $BaSO_4$), 276 grams of 35% leaded zinc oxide, 31 grams of Asbestine (essentially magnesium silicate), 31 grams of silica and 4 grams of fumed litharge. These pigments were well mixed, dry, with simple stirring and to this mixture there was then added a mixture of oil and mineral spirits made up of 50 grams of acid refined linseed oil, 26 grams of body "Q" kettle bodied linseed oil (a linseed oil which had been treated to the point where it contained a substantial percentage of solid ingredients dissolved in the colloidal state) and 25 grams of mineral spirits. This oil is preferably added at a temperature of about 300° F. in order to make it easier to stir, but this is not essential and the addition at atmospheric temperatures is feasible. In any event, the stirring in of the pigment lowers the temperature appreciably and at this stage in the process the pigment is not substantially dispersed but is simply mixed with the liquid.

To the paste or slurry produced by this mixing there was added 246 grams of acid refined linseed oil at a temperature of 350° F. This was stirred into the mass for 5 minutes and the mass was then cooled by continued agitation and the use of a cold water jacket. There was then added 0.26 gram of 6% cobalt naphthenate drier and 2.60 grams of 6% manganese naphthenate drier, and finally there was stirred in 5 grams of a 2% aqueous soda ash solution. The resultant product was a smooth paint of good brushing consistency having a Pfund cryptometer reading of 18°; the hiding power was about equal to that obtained when the same formula was given a good enamel grind on a stone mill or colloid mill. No pigment break after bodying, or pigment settling was observed after two weeks. The paint dried well with a high gloss and with a higher degree of whiteness than the same formula produced by the usual cold grinding process. The paint produced by adding the first body of liquid at room temperature instead of at an elevated temperature differed but little from the other batch but needed more power for the first stirring.

Example IIIF 8 grams of carbon black was stirred into a hot solution (100° C.) made up of 12 grams of dibutyl phthalate and 20 grams of blown castor oil (Baker's No. 15). After a few minutes stirring, there was added 57.2 grams of alcohol wet nitrocellulose (½ second type) together with 46.8 grams of petroleum diluent (Tolusol) and 80 grams of toluene. After the mixture had been completed forming a slurry in which the pigment was practically undispersed (a smear on glass was rough and specky) there was slowly added a mixture of 32 grams of ethyl acetate and 64 grams butyl acetate. The addition of the final two solvents covered a period of about 30 minutes and upon the completion of this addition, it was found that a sample of the product gave a reading on a Pfund cryptometer of 9. This was considered excellent since it was precisely equal in hiding to the same pigment concentration in an alkyd enamel ground for 100 hours on a pebble mill.

In the foregoing examples, I refer to Pfund cryptometer tests. The cryptometer is a standard instrument for measuring the minimum thickness of a pigmented film which will give the same hiding power as an infinitely thick film of the same material. The designations on the readings obtained on a cryptometer are arbitrary, but are well recognized in the art. For any given pigment and vehicle the hiding power reaches a maximum when dispersion of the pigment in the vehicle is complete. Hence this instrument can be used for determining the degree of dispersion of a given pigment in a given vehicle by comparing the cryptometer reading with the reading obtained when the same pigment is perfectly dispersed in the same vehicle. Thus it will be noted that in the last example given above the pigment which was dispersed almost immediately by my process gave an identical hiding value to the same pigment dispersed by a treatment of 100 hours on a pebble mill. This means that the two had substantially the same degree of dispersion.

In addition to the specific materials set forth in the examples given, I have carried on the operation using various pigments of the titanium and lithopone groups, also the lead chromate types, toluidines, iron oxides, drop black, iron blues and carbon blacks. These were made up with various types of liquid body such as the varnish and alkyd resin solutions described above, and also with solutions comprising blown and kettle bodied oils. The pastes were prepared both hot and cold and in every case were adjusted so as to give a good stirrable slurry. Thinning of the slurries was performed by the use of vehicles both hot and cold ranging from temperatures of approximately 350° F. down to room temperature. It was found that the use of hot liquids for the original mixture simplified the first mixing step and the most efficient dispersions were obtained by thinning the original mixtures with hot liquids. However, valuable results were obtained as set forth above when the entire operations were carried on in the cold.

It will be seen that in all of the examples given, at some stage in the procedure a fluid mass is formed having present a solid phase consisting of film-forming material at least a part of which is in the form of gelatinous particles and a liquid phase in which the gelatinous particles are dispersed. The liquid phase usually has some swelling effect upon the solid film-forming material, but does not actually dissolve it under the conditions of concentration or temperature then obtaining. The pigment is mixed with the solid phase film-forming material and then the nature of this liquid phase is changed so that its solvent action on the gelatinous particles is greatly increased. This change in the nature of the liquid phase is accomplished either by adding a liquid which is a solvent for the gelatinous material so that the chemical nature of the liquid phase is changed, or by rapidly heating the liquid phase material, or changing its concentration, so that its physical nature is changed sufficiently to cause it to have a solvent action upon the gelatinous particles. In any case, this change in the nature of the liquid phase, by increasing its solvent action on the gelatinous particles, increases the degree of dispersion of the film-forming material in the liquid phase and thereby causes the pigment aggregates to be broken up and the pigment to be dispersed throughout the mass.

What I claim is:

1. The method of preparing liquid coating compositions which comprises preparing a fluid mass including a solid phase comprising film-forming material at least a portion of which is in a gelatinous state and a liquid phase consisting of an organic liquid of the type used in liquid coating compositions in which said film-forming material remains at least in part in the form of gelatinous particles under the conditions under which the fluid mass is prepared, mixing with the film-forming material a finely ground pigment and conducting such mixing in such manner that such a proportion of the pigment remains in the mass in the form of undispersed aggregates that the mass is not sufficiently uniform to render it available for usual film-forming purposes, and thereafter, without subjecting the mass to a mechanical treatment adapted materially to cause further breaking up of such pigment aggregates, adding to said liquid phase additional organic liquid of the type used in liquid coating compositions and adapted to increase the solvent action of the liquid phase on the said gelatinous particles so that the degree of dispersion of said gelatinous particles is increased, whereby the pigment aggregates are broken up and the pigment is dispersed through the mass.

2. A method as specified in claim 1 in which the liquid added is a solvent for such gelatinous particles.

3. A method of preparing liquid coating compositions which comprises preparing a fluid mass including a solid phase comprising film-forming material at least a portion of which is in a gelatinous state and a liquid phase consisting of an organic liquid of the type used in liquid coating compositions in which said film-forming material remains at least in part in the form of gelatinous particles at the temperature at which the mass is prepared but which is adapted to dissolve such gelatinous particles at higher temperatures, mixing with the film-forming material a finely ground pigment and conducting such mixing in such manner that such a proportion of the pigment remains in the mass in the form of undispersed aggregates that the mass is not sufficiently uniform to render it available for usual film-forming purposes, and thereafter, without subjecting the mass to a mechanical treatment adapted materially to cause further breaking up of such pigment aggregates, adding to said liquid phase additional hot organic liquid of the type used in liquid coating compositions sufficient substantially to raise the temperature of said liquid phase, whereby the temperature of the liquid phase is rapidly increased to increase its solvent action on the gelatinous particles, so that the degree of dispersion of said gelatinous particles is increased, whereby the pigment aggregates are broken up and the pigment is dispersed through the mass.

4. The method of preparing liquid coating compositions which comprises preparing a fluid mass including a solid phase comprising film-forming material at least a portion of which is in a gelatinous state and a liquid phase consisting of an organic liquid of the type used in liquid coating compositions in which said film-forming material remains at least in part in the form of gelatinous particles at the temperature at which the mass is prepared but which is adapted to dissolve such gelatinous particles at higher temperatures, mixing with the film-forming material a finely ground pigment and conducting such mixing in such manner that such a proportion of the pigment remains in the mass in the form of undispersed aggregates that the mass is not sufficiently uniform to render it available for usual film-forming purposes, and thereafter, without subjecting the mass to a mechanical treatment adapted materially to cause further breaking up of such pigment aggregates, rapidly heating the mass so as to increase the solvent action of the liquid phase on the said gelatinous particles so that the degree of dispersion of said gelatinous particles is increased, whereby the pigment aggregates are broken up and the pigment is dispersed through the mass.

5. A method of pigmenting enamels, which comprises forming a stirrable slurry comprising a synthetic resin of a type used in making enamels at least a portion of which is in a gelatinous state and a liquid phase consisting of an organic liquid of a type used in enamels in which said resin remains at least in part in the form of gelatinous particles, mixing with the resin material a finely ground pigment and conducting such mixing in such manner that such a proportion of the pigment remains in the mass in the form of undispersed aggregates that the mass is not sufficiently uniform to render it available as an enamel and thereafter, without subjecting the mass to a mechanical treatment adapted materially to cause further breaking up of such pigment aggregates, adding to the mass an organic liquid of the type used in liquid coating compositions which will cause the liquid phase to have an increased solvent action on the gelatinous particles of resin so that the degree of dispersion of said particles is increased whereby the pigment aggregates are broken up and the pigment dispersed throughout the mass.

6. The method of preparing liquid coating compositions which comprises forming a stirrable slurry of a gelatinous precipitate by adding to an organic liquid solution of a film-forming material an excess of an organic liquid which is a non-solvent for said film-forming material, adding a pigment to said slurry and subjecting the mass to continued stirring so as to wet the pigment particles but in such a manner that the pigment particles are not sufficiently dispersed to render the mass available for usual film-forming purposes, and without subjecting the mass to a mechanical treatment adapted to cause breaking up of pigment aggregates, adding to the mass additional organic liquid solvent for the gelatinous precipitate, whereby the dispersion of the gelatinous particles is increased and the pigment is dispersed throughout the mass.

7. The method of preparing liquid coating compositions which comprises mixing a pigment with an organic liquid solution of a film forming material, adding to said solution an excess of an organic liquid which is a non-solvent for said film forming material so as to form a stirrable slurry of a gelatinous precipitate of said film forming material, subjecting the mass of gelatinous precipitate and pigment to continued stirring so as to wet the pigment particles but in such a manner that the pigment particles are not sufficiently dispersed to render the mass available for usual film forming purposes and without subjecting the mass to a mechanical treatment adapted to cause breaking up of pigment aggregates, adding to the mass additional organic liquid solvent for the gelatinous precipitate, whereby the dispersion of the gelatinous particles is increased and the pigment is dispersed throughout the mass.

8. The method of preparing liquid coating compositions which comprises preparing a stirrable slurry including a solid phase comprising film forming material at least a porton of which is in a gelatinous state and a liquid phase consisting of an organic liquid of the type used in liquid coating compositions in which said film forming material remains at least in part in the form of gelatinous particles under the conditions under which the fluid mass is prepared, said organic liquid comprising a mixture of organic solvents and non-solvents for said film forming material, mixing a pigment with said slurry and subjecting the mass to continued stirring so as to wet the pigment particles but in such a manner that the pigment particles are not sufficiently dispersed to render the mass available for usual film forming purposes and without subjecting the mass to a mechanical treatment adapted to cause breaking up of pigment aggregates, adding to said liquid phase additional organic liquid of the type used in liquid coating compositions and adapted to increase the solvent action of the liquid phase on the said gelatinous particles, whereby the dispersion of the gelatinous particles is increased and the pigment is dispersed throughout the mass.

9. A method of pigmenting enamels which comprises forming a stirrable slurry including a solid phase comprising a resinous film forming material of a type used in making enamels at least a portion of which is in a gelatinous state and a liquid phase comprising an organic liquid of a type used in enamels in which said resinous film forming material remains at least in part in the form of gelatinous particles, mixing a pigment with said slurry and subjecting the mass to continued stirring so as to wet the pigment particles but in such a manner that the pigment particles are not sufficiently dispersed to render the mass available for usual film forming purposes and without subjecting the mass to a mechanical treatment adapted to cause breaking up of pigment aggregates, adding to the mass additional organic liquid of a type used in enamels which will cause the liquid phase to have an increased solvent action on the gelatinous particles of resinous film forming material, whereby the dispersion of the gelatinous particles is increased and the pigment is dispersed throughout the mass.

10. A method of pigmenting lacquers which comprises forming a stirrable slurry including a solid phase comprising a cellulose derivative film forming material of a type used in making lacquers at least a portion of which is in a gelatinous state and a liquid phase comprising an organic liquid of a type used in lacquers in which said cellulose derivative remains at least in part in the form of gelatinous particles, mixing a pigment with said slurry and subjecting the mass to continued stirring so as to wet the pigment particles but in such a manner that the pigment particles are not sufficiently dispersed to render the mass available for usual film forming purposes and without subjecting the mass to a mechanical treatment adapted to cause breaking up of pigment aggregates, adding to the mass additional organic liquid of a type used in lacquers which will cause the liquid phase to have an increased solvent action on the gelatinous particles of cellulose derivative, whereby the dispersion of the gelatinous particles is increased and the pigment is dispersed throughout the mass.

11. A method of pigmenting varnishes which comprises forming a stirrable slurry including a solid phase comprising an oil film forming material of a type used in making varnishes at least a portion of which is in a gelatinous state and a liquid phase comprising an organic liquid of a type used in varnishes in which said oil film forming material remains at least in part in the form of gelatinous particles, mixing a pigment with said slurry and subjecting the mass to continued stirring so as to wet the pigment particles but in such a manner that the pigment particles are not sufficiently dispersed to render the mass available for usual film forming purposes and without subjecting the mass to a mechanical treatment adapted to cause breaking up of pigment aggregates, adding to the mass additional organic liquid of a type used in varnish which will cause the liquid phase to have an increased solvent action on the gelatinous particles of oil film forming material, whereby the dispersion of the gelatinous particles is increased and the pigment is dispersed throughout the mass.

12. The method of preparing liquid coating compositions which comprises preparing a stirrable slurry including a solid phase comprising film forming material selected from the class consisting of cellulose derivatives, synthetic resins, natural resins, varnishes and oils, at least a portion of which is in a gelatinous state and a liquid phase comprising an organic liquid of the type used in liquid coating compositions in which said film forming material remains at least in part in the form of gelatinous particles under the conditions under which the slurry is prepared, mixing a pigment with said slurry and subjecting the mass to continued stirring so as to wet the pigment particles but in such a manner that the pigment particles are not sufficiently dispersed to render the mass available for usual film forming purposes and without subjecting the mass to a mechanical treatment adapted to cause breaking up of pigment aggregates, adding to said liquid phase additional organic liquid of the type used in liquid coating compositions and adapted to increase the solvent action of the liquid phase on the said gelatinous particles, whereby the dispersion of the gelatinous particles is increased and the pigment is dispersed throughout the mass.

13. A method of pigmenting lacquers which comprises forming a slurry including a solid phase comprising a soluble cellulose ester in the fibrous gelatinous state wet with a liquid phase comprising organic liquid of a type used in lacquers in which said cellulose ester remains substantially undissolved, mixing a pigment with said slurry and subjecting the mass to a stirring operation so as to wet pigment particles but in such a manner that the pigment particles are not sufficiently dispersed to render the mass available for usual film-forming purposes, and then without subjecting the mass to additional mechanical treatment adapted to cause substantial breaking up of pigment aggregates, adding to the mass additional organic liquid of a type used in lacquers which will cause the dispersion of the cellulose ester particles to be increased, so that the cellulose ester is colloidally dissolved and the pigment is dispersed throughout the mass.

ALEXANDRE JAMES LAPOINTE.